US012640136B2

(12) United States Patent
Wang

(10) Patent No.: US 12,640,136 B2
(45) Date of Patent: May 26, 2026

(54) METHOD FOR TRAINING MODEL, SPEECH RECOGNITION METHOD, APPARATUS, MEDIUM, AND DEVICE

(71) Applicant: BEIJING YOUZHUJU NETWORK TECHNOLOGY CO. LTD., Beijing (CN)

(72) Inventor: Kang Wang, Beijing (CN)

(73) Assignee: BEIJING YOUZHUJU NETWORK TECHNOLOGY CO. LTD., Beijing (CN)

( * ) Notice: Subject to any disclaimer, the term of this patent is extended or adjusted under 35 U.S.C. 154(b) by 434 days.

(21) Appl. No.: 18/257,403

(22) PCT Filed: Nov. 18, 2021

(86) PCT No.: PCT/CN2021/131442
§ 371 (c)(1),
(2) Date: Jun. 14, 2023

(87) PCT Pub. No.: WO2022/134968
PCT Pub. Date: Jun. 30, 2022

(65) Prior Publication Data
US 2024/0105162 A1     Mar. 28, 2024

(30) Foreign Application Priority Data

Dec. 24, 2020     (CN) .......................... 202011554089.8

(51) Int. Cl.
*G10L 15/00*          (2013.01)
*G10L 15/06*          (2013.01)
*G10L 15/22*          (2006.01)

(52) U.S. Cl.
CPC .......... *G10L 15/063* (2013.01); *G10L 15/005* (2013.01); *G10L 15/22* (2013.01)

(58) Field of Classification Search
CPC ........ G06F 9/454; G06F 40/263; G06F 40/53; G06F 40/55; G06F 40/25; G06F 40/211;
(Continued)

(56) References Cited

U.S. PATENT DOCUMENTS

2007/0011117 A1     1/2007   Abdulkader et al.
2017/0061956 A1*    3/2017   Sarikaya .................. G06N 5/01
(Continued)

FOREIGN PATENT DOCUMENTS

CN          104199810 A      12/2014
CN          108335693 A      7/2018
(Continued)

OTHER PUBLICATIONS

China National Intellectual Property Administration, Notice of Allowance Issued in Application No. 202011554089.8, May 9, 2023, 5 pages.
(Continued)

*Primary Examiner* — Vu B Hang
(74) *Attorney, Agent, or Firm* — Alleman Hall LLP

(57) ABSTRACT

The present disclosure relates to a method for training a model, a speech recognition method, an apparatus, a medium, and a device, the method including: acquiring training data, wherein the training data includes labeled data of at least two languages; ranking the languages in a descending order of a quantity of the labeled data of each language to obtain a training order corresponding to the languages; and sequentially acquiring, in accordance with ranking of the languages indicated by the training order, target data corresponding to each language to perform iterative training on a preset model, to obtain a target speech recognition model, wherein the target data is determined in accordance with the labeled data of language(s) from first ranking to current ranking in the training order.

17 Claims, 3 Drawing Sheets

600

(58) Field of Classification Search
CPC .... G06F 40/253; G06F 40/268; G06F 40/284;
G06F 40/30; G10L 15/07; G10L 15/20;
G10L 15/22; G10L 15/02; G10L 15/26;
G10L 15/30; G10L 15/063; G10L 15/12;
G10L 15/16; G10L 25/27; G10L 25/30;
G10L 19/005; G10L 19/00; G10L
15/1822; G10L 15/183; G10L 15/19;
G10L 15/193; G10L 15/005
See application file for complete search history.

(56) References Cited

U.S. PATENT DOCUMENTS

| | | |
|---|---|---|
| 2017/0352345 A1 | 12/2017 | Kurata et al. |
| 2018/0218736 A1 | 8/2018 | Itoh et al. |
| 2019/0251168 A1 | 8/2019 | McCann et al. |
| 2022/0300763 A1 | 9/2022 | Li et al. |

FOREIGN PATENT DOCUMENTS

| | | |
|---|---|---|
| CN | 110880007 A | 3/2020 |
| CN | 111539220 A | 8/2020 |
| CN | 111613209 A | 9/2020 |
| CN | 111680517 A | 9/2020 |
| CN | 111768761 A | 10/2020 |
| CN | 111859951 A | 10/2020 |
| CN | 111933121 A | 11/2020 |
| CN | 112069321 A | 12/2020 |
| CN | 112669816 A | 4/2021 |

OTHER PUBLICATIONS

China National Intellectual Property Administration, International Search Report Issued in Application No. PCT/CN2021/131442, Feb. 15, 2022, 6 pages.
China National Intellectual Property Administration, Written Opinion of the International Searching Authority Issued in Application No. PCT/CN2021/131442, Feb. 15, 2022, WIPO, 4 pages.

* cited by examiner

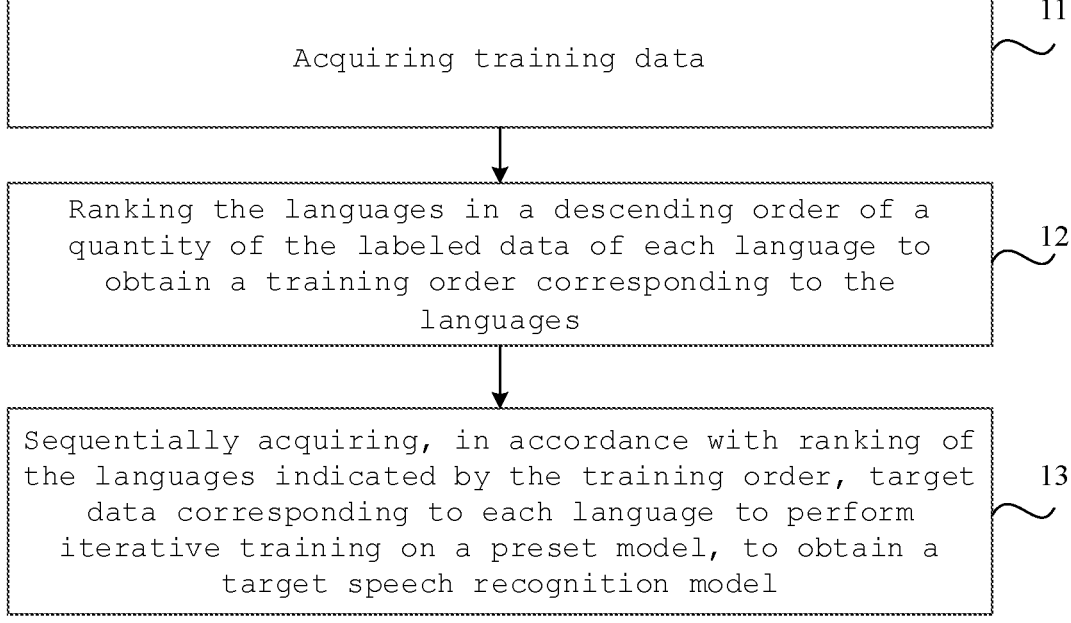

Acquiring training data                                                                    11

Ranking the languages in a descending order of a quantity of the labeled data of each language to obtain a training order corresponding to the languages          12

Sequentially acquiring, in accordance with ranking of the languages indicated by the training order, target data corresponding to each language to perform iterative training on a preset model, to obtain a target speech recognition model          13

FIG. 1

Receiving speech data to be recognized 21

Inputting the speech data into a target speech recognition model, and taking a recognition result output by the target speech recognition model as a recognition result of the speech data 22

Apparatus for training a speech recognition model 10

Acquiring module 101

Ranking module 102

Training module 103

METHOD FOR TRAINING MODEL, SPEECH RECOGNITION METHOD, APPARATUS, MEDIUM, AND DEVICE

CROSS-REFERENCE TO RELATED APPLICATIONS

This application is a U.S. National Stage under 35 U.S.C. § 371 of International Application No. PCT/CN2021/131442, as filed on Nov. 18, 2021, which is based on and claims the priority to the Chinese patent application No. 202011554089.8 entitled "METHOD FOR TRAINING MODEL, SPEECH RECOGNITION METHOD, APPARATUS, MEDIUM, AND DEVICE" filed on Dec. 24, 2020. The disclosure of each of these applications is incorporated herein by reference in its entirety.

TECHNICAL FIELD

The present disclosure relates to the field of computer technologies, and in particular, to a method for training a model, a speech recognition method, an apparatus, a medium, and a device.

BACKGROUND

In a promotion process of internationalization, people will run into speech recognition trouble of multiple languages. Each language has its uniqueness, and has a different range and popularity of use. Therefore, a speech recognition model capable of recognizing speech data of multiple languages has emerged. However, in training data of the speech recognition model, acquisition difficulties for the different languages and quantities of speech data of the different languages are different, and usually, the more widely a language is used, the more training data it corresponds to. In the related art, usually, the training data corresponding to the languages with different quantities of training data are mixed together for training, which results in a higher recognition rate of a trained model for a language with a greater data quantity and a lower recognition rate for a language with a less data quantity.

SUMMARY

The "SUMMARY" part is provided to introduce concepts in a simplified form, which will be described in detail below in the following "DETAILED DESCRIPTION" part. The "SUMMARY" part is not intended to identify key features or essential features of the claimed technical solutions, nor is it intended to limit the scope of the claimed technical solutions.

In a first aspect, the present disclosure provides a method for training a speech recognition model, comprising:

acquiring training data, wherein the training data comprises labeled data of at least two languages;

ranking the languages in a descending order of a quantity of the labeled data of each language to obtain a training order corresponding to the languages; and sequentially acquiring, in accordance with ranking of the languages indicated by the training order, target data corresponding to each language to perform iterative training on a preset model, to obtain a target speech recognition model, wherein the target data is determined in accordance with the labeled data of language(s) from first ranking to current ranking in the training order, and the target speech recognition model is used for performing speech recognition on speech data of the at least two languages.

In a second aspect, there is provided a speech recognition method, comprising:

receiving speech data to be recognized; and inputting the speech data into a target speech recognition model, and taking a recognition result output by the target speech recognition model as a recognition result of the speech data, wherein the target speech recognition model is trained in accordance with the method of the first aspect.

In a third aspect, there is provided an apparatus for training a speech recognition model, comprising:

an acquiring module configured to acquire training data, wherein the training data comprises labeled data of at least two languages;

a ranking module configured to rank the languages in a descending order of a quantity of the labeled data of each language to obtain a training order corresponding to the languages; and a training module configured to sequentially acquire, in accordance with ranking of the languages indicated by the training order, target data corresponding to each language to perform iterative training on a preset model, to obtain a target speech recognition model, wherein the target data is determined in accordance with the labeled data of language(s) from first ranking to current ranking in the training order, and the target speech recognition model is used for performing speech recognition on speech data of the at least two languages.

In a fourth aspect, there is provided a speech recognition apparatus, comprising:

a receiving module configured to receive speech data to be recognized; and an input module configured to input the speech data into a target speech recognition model, and take a recognition result output by the target speech recognition model as a recognition result of the speech data, wherein the target speech recognition model is trained in accordance with the method of the first aspect.

In a fifth aspect, there is provided a non-transitory computer-readable medium having a computer program stored thereon, wherein the program, when executed by a processing device, implements the method of the first aspect, or implements the method of the second aspect.

In a sixth aspect, there is provided an electronic device, comprising:

a storage device having a computer program stored thereon; and a processing device configure to execute the computer program in the storage device to implement the method of the first aspect, or to implement the method of the second aspect.

In a seventh aspect, there is provided a computer program, which when executed by a processing device, implements the method of the first aspect, or implements the method of the second aspect.

In an eighth aspect, there is provided a computer program product having a computer program stored thereon, wherein the program, when executed by a processing device, implements the method of the first aspect, or implements the method of the second aspect.

In the above technical solutions, when a speech recognition model is trained in accordance with labeled data comprising a plurality of languages, firstly, the languages are ranked in a descending order of a quantity of the labeled data of each language to obtain a training order corresponding to the languages, and then, in accordance with ranking of the languages indicated by the training order, target data corresponding to each language is sequentially acquired to perform iterative training on a preset model, to obtain a target speech recognition model. Therefore, with use of the above technical solutions, in the process of training the speech recognition model for the plurality of languages, in accordance with the quantity of the labeled data of each language, the training can be made preferentially using a language with a greater quantity of the labeled data, and, the training data adopted in the process of each iterative training not only comprises the labeled data of a language in current ranking, but also comprises the labeled data of language(s) before this ranking, so that influence of uneven quantity distribution of the labeled data on accuracy of the target speech recognition model can be effectively avoided, and meanwhile training efficiency of the target speech recognition model can be improved. Meanwhile, a recognition rate of the speech recognition model determined through the current iteration process for the language in the current ranking can be ensured, and a recognition rate of the model for the language(s) with a greater quantity of the labeled data can be ensured, so that a comprehensive recognition rate of the determined target speech recognition model for the various languages can be improved, which improves the accuracy of the target speech recognition model, and enhances use experience of a user.

Other features and advantages of the present disclosure will be described in detail in the following "DETAILED DESCRIPTION" part.

BRIEF DESCRIPTION OF THE DRAWINGS

The above and other features, advantages, and aspects of embodiments of the present disclosure will become more apparent in conjunction with the accompanying drawings and with reference to the following "DETAILED DESCRIPTION" part. Throughout the drawings, identical or similar reference numbers refer to identical or similar elements. It should be understood that the drawings are illustrative and that components and elements are not necessarily drawn to scale. In the drawings:

FIG. 1 is a flow diagram of a method for training a speech recognition model in accordance with one embodiment of the present disclosure;

DETAILED DESCRIPTION

Figure 2:
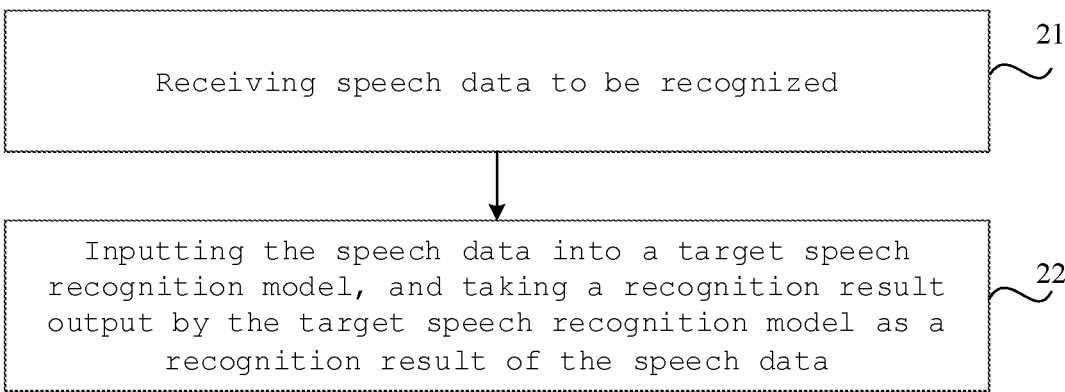
FIG. 2 is a flow diagram of a speech recognition method in accordance with one embodiment of the present disclosure.

The embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, and conversely, these embodiments are provided for a more complete and thorough understanding of the present disclosure. It should be understood that the drawings and the embodiments of the present disclosure are for illustration only and are not intended to limit the scope of the present disclosure.

It should be understood that various steps recited in method embodiments of the present disclosure may be performed in a different order, and/or performed in parallel. Moreover, the method embodiments may comprise additional steps and/or omit performing the illustrated steps. The scope of the present disclosure is not limited in this respect.

The term "comprising" and variations thereof used herein are intended to be open-minded, i.e., "comprising but not limited to". The term "based on" is "at least partially based on". The term "one embodiment" means "at least one embodiment"; the term "another embodiment" means "at least one other embodiment"; the term "some embodiments" means "at least some embodiments". Relevant definitions for other terms will be given in the following description.

It should be noted that the concepts "first", "second", and the like mentioned in the present disclosure are only used for distinguishing different devices, modules or units, and are not used for limiting the order or interdependence of functions performed by the devices, modules or units.

It should be noted that modifications of "one" or "a plurality of" mentioned in this disclosure are intended to be illustrative rather than restrictive, and that those skilled in the art should appreciate that they should be understood as "one or more" unless otherwise explicitly stated in the context.

Names of messages or information exchanged between a plurality of devices in the embodiments of the present disclosure are for illustration only, and are not intended to limit the scope of the messages or information.

FIG. 1 illustrates a flow diagram of a method for training a speech recognition model in accordance with one embodiment of the present disclosure, as shown in FIG. 1, the method comprising:

step 11, acquiring training data, wherein the training data comprises labeled data of at least two languages. Exemplarily, the training data may be pre-labeled data comprising a plurality of languages.

Step 12, ranking the languages in a descending order of a quantity of the labeled data of each language to obtain a training order corresponding to the languages.

Exemplarily, the training data comprises the labeled data of 4 languages, wherein a quantity of the labeled data of a language A1 is T1, a quantity of the labeled data of a language A2 is T2, a quantity of the labeled data of a language A3 is T3, and a quantity of the labeled data of a language A4 is T4. If T1>T2>T3>T4, it is determined that a training order corresponding to the languages is A1, A2, A3, A4.

Step 13, sequentially acquiring, in accordance with ranking of the languages indicated by the training order, target data corresponding to each language to perform iterative training on a preset model, to obtain a target speech recognition model, wherein the target data is determined in accordance with the labeled data of language(s) from first ranking to current ranking in the training order, and the target speech recognition model is used for performing speech recognition on speech data of the at least two languages. For example, in the above example, the target data corresponding to the language A1 is determined in accordance with the labeled data of the language A1, the target data corresponding to the language A2 is determined in accordance with the labeled data of languages (i.e., the language A1 and the language A2) from first ranking to current ranking in the training order, and similarly, the target data corresponding to the language A3 is determined in accordance with the labeled data of the languages A1, A2, and A3. Determination of the target data corresponding to a language in other ranking is similar, which is not repeated here.

In this step, based on the ranking of the languages indicated by the training order, the iterative training is sequentially performed on the preset model based on the target data corresponding to each language; that is, one language is added in each iterative training, and the target data for training in the process of this iteration will comprise the labeled data of a current language and the labeled data of other language(s) with a greater quantity of the labeled data than the current language.

In the above technical solution, when a speech recognition model is trained in accordance with the labeled data comprising a plurality of languages, firstly, the languages are ranked in a descending order of a quantity of the labeled data of each language to obtain a training order corresponding to the languages, and then, in accordance with ranking of the languages indicated by the training order, the target data corresponding to each language is sequentially acquired to perform iterative training on a preset model, to obtain a target speech recognition model. Therefore, with use of the above technical solution, in the process of training the speech recognition model for the plurality of languages, in accordance with the quantity of the labeled data of each language, the training can be made preferentially using a language with a greater quantity of the labeled data, and, the training data adopted in the process of each iterative training not only comprises the labeled data of a language in current ranking, but also comprises the labeled data of language(s) before this ranking, so that influence of uneven quantity distribution of the labeled data on accuracy of the target speech recognition model can be effectively avoided, and meanwhile training efficiency of the target speech recognition model can be improved. Meanwhile, a recognition rate of the speech recognition model determined through the current iteration process for the language in the current ranking can be ensured, and a recognition rate of the model for the language(s) with a greater quantity of the labeled data can be ensured, so that a comprehensive recognition rate of the determined target speech recognition model for the various languages can be improved, which improves the accuracy of the target speech recognition model, and enhances use experience of a user.

In order to facilitate those skilled in the art to understand the technical solutions of the embodiments provided in the present disclosure, the detailed description is made below for the above steps.

In one possible embodiment, an exemplary implementation of the sequentially acquiring, in accordance with ranking of the languages indicated by the training order, target data corresponding to each language to perform iterative training on a preset model, to obtain a target speech recognition model in the step 13 is as follows, and the step may comprise:

acquiring target data corresponding to a target language, wherein the target language is initially a first-ranking language in the training order; that is, the iterative training starts from the first-ranking language in accordance with the ranking of the languages indicated by the training order.

As an example, an exemplary implementation of the acquiring target data corresponding to a target language may comprise:

in a case wherein the target language is the first-ranking language, taking data of a first quantity in labeled data of the target language as the target data, wherein the first quantity is greater than a quantity of the labeled data of the language immediately after the target language in the training order, and the first quantity is less than or equal to a quantity of the labeled data of the target language.

As in the above example, a first-ranking language is the language A1; when the target data corresponding to the language A1 is determined, the labeled data of a first quantity in the language A1 may be taken as the target data, and the language immediately after the target language A1 in the training order is the language A2, then the first quantity is less than or equal to T1, and the first quantity is greater than T2. Exemplarily, the first quantity is the quantity of the labeled data of the target language, namely, T1, so that the preset model can be trained based on all the labeled data of the language A1, thereby improving a data recognition rate of the trained model for the language A1.

In a case wherein the target language is not the first-ranking language and not a last-ranking language, data of a second quantity is respectively acquired from the labeled data of the target language and the labeled data of each language ranked before the target language, as the target data, wherein the second quantity is greater than a quantity of the labeled data of the language immediately after the target language in the training order, and the second quantity is less than or equal to the quantity of the labeled data of the target language.

In the above example, for the language A2, when target data corresponding to the language A2 is determined, the labeled data of a second quantity may be respectively acquired from the labeled data of the language A1 and the labeled data of the language A2, as the target data corresponding to the language A2. For the language A3, when target data corresponding to the language A3 is determined, the labeled data of a second quantity may be respectively acquired from the labeled data of the language A1, the language A2 and the language A3, as the target data corresponding to the language A3.

Optionally, the second quantity is the quantity of the labeled data of the target language, that is, when the target language is the language A2, the second quantity is the quantity of the labeled data of the language A2, and when the target language is the language A3, the second quantity is the quantity of the labeled data of the language A3. Therefore, the determined target data corresponding to the language A2 comprises all the labeled data of the language A2 and the labeled data of the quantity T2 obtained from the labeled data of the language A1; and the determined target data corresponding to the language A3 comprises all the labeled data of the language A3, the labeled data of the quantity T3 obtained from the labeled data of the language A1, and the labeled data of the quantity T3 obtained from the labeled data of the language A2.

Therefore, in this embodiment, in the process of each iterative training, not only the labeled data of the current language is included, but also the labeled data of each language with a greater quantity of the labeled data than the target language can be included, thereby effectively ensuring a recognition rate for other language(s) already subjected to the iterative training while improving a recognition rate of the speech recognition model for the target language. Moreover, in the embodiment, the quantity of the used labeled data for each language participating in the training is the same in the process of each iterative training, so that data evenness in the process of this iterative training can, to a certain extent, be ensured to effectively solve the problem of uneven data distribution, and a comprehensive recognition rate of the speech recognition model for speech data of the plurality of languages is further improved.

In a case wherein the target language is the last-ranking language, the labeled data of a third quantity is respectively acquired from each of the languages, as the target data, wherein the third quantity is a quantity of the labeled data of the target language.

Exemplarily, when target data corresponding to the language A4 is determined, all the labeled data of the language A4, the labeled data of the quantity T4 obtained from the labeled data of the language A1, the labeled data of the quantity T4 obtained from the labeled data of the language A2, and the labeled data of the quantity T4 obtained from the labeled data of the language A3 may be taken as the target data corresponding to the language A4.

After the target data corresponding to the target language is acquired, an initial model corresponding to the target language is trained in accordance with the target data corresponding to the target language, to obtain a target model corresponding to the target language, wherein the initial model is the preset model in a case wherein the target language is the first-ranking language, and, the initial model is a target model corresponding to the language immediately before the target language in the training order in a case wherein the target language is not the first-ranking language; and the language immediately after the target language in the training order is taken as a new target language to return to the step of obtaining target data corresponding to the target language, until the labeled data of each language is subjected to the iterative training, and a target model corresponding to the last-ranking language in the training order is determined as the target speech recognition model.

In this embodiment, in the process of a first iterative training, the preset model may be trained based on the target data corresponding to the language A1, for example, the target data is input into the preset model, so that model parameters of the preset model may be adjusted in accordance with a loss between a recognition result output by the preset model and a corresponding labelling result in the target data, thereby obtaining the target model corresponding to the language A1. Thereafter, in the process of a next iterative training, when the model training is performed based on the target data corresponding to the language A2, the initial model corresponding to the language A2 is the target model corresponding to the language A1, so that the training can be further performed based on the target data corresponding to the language A2. Thereafter, the training for other languages is similar, which is not repeated here. Finally, until the model training has been completed based on the target data corresponding to the last-ranking language in the training order, namely, the iterative training has been performed on the labeled data of each language, a target model corresponding to the last-ranking language in the training order is determined as the target speech recognition model, which can recognize speech data corresponding to the languages participating in the training.

Therefore, with use of the above technical solution, in the process of training the speech recognition model, the target data corresponding to one language is newly added in each iterative training process, and meanwhile the training can be further performed on the basis of the model obtained in the previous one iterative training, so that a recognition effect of a language with a greater quantity of the labeled data is ensured while training a language with a less quantity of the labeled data, thereby ensuring a recognition rate of the finally trained target speech model for speech data of the various languages.

In a possible embodiment, the present disclosure further provides a speech recognition method, as shown in FIG. 2, comprising:

step 21, receiving speech data to be recognized;

step 22, inputting the speech data into a target speech recognition model, and taking a recognition result output by the target speech recognition model as a recognition result of the speech data, so as to accurately recognize the speech data.

In a possible embodiment, the target model corresponding to each language in the iterative training process may be saved in the target speech recognition model, and the target model corresponding to a language may be used for recognizing speech data of this language and speech data of each language ranked before this language in the ranking of the languages indicated by the training order; then the inputting the speech data into a target speech recognition model, and taking a recognition result output by the target speech recognition model as a recognition result of the speech data, comprising: determining a language of the speech data; and inputting the speech data into a target model corresponding to the language, and taking a recognition result output by the target model as the recognition result of the speech data. Therefore, the speech data can be recognized based on the target model corresponding to the language of the speech data, so that accuracy of the speech data recognition is further improved.

The speech recognition method may further comprise: determining a language of the received speech data, inputting the speech data into a target model corresponding to the language, and taking a recognition result output by this target model as a recognition result of the speech data.

In a possible embodiment, in the process of acquiring target data corresponding to each language to perform iterative training on a preset model, a model learning rate corresponding to each iterative training is in a positive correlation with a quantity of the labeled data of the language newly added in this iterative training. Therefore, in this embodiment, the model learning rate corresponding to each iterative training is sequentially decreased, and therefore, an adjustment range of the model parameters in the process of each iterative training can be gradually decreased, so that the trained and updated target model can not only accurately recognize the current-ranking language, but also not greatly affect a recognition rate for trained other-ranking language(s), which further ensures recognition accuracy of the determined target speech recognition model for each language.

In one possible embodiment, the model learning rate corresponding to each iterative training is determined by:

in a case wherein the iterative training is a first iteration, determining a preset learning rate as a model learning rate corresponding to the iterative training. The preset learning rate may be set in accordance with an actual usage scenario, which is not limited by the present disclosure. In this embodiment, when the preset model is trained based on the target data corresponding to the language A1, its corresponding model learning rate is the preset learning rate.

In a case wherein the iterative training is not the first iteration, determining a product of the model learning rate corresponding to previous one iterative training and a target proportion as the model learning rate corresponding to this iterative training, wherein the target proportion is less than 1.

As an example, the target proportion may be preset, so that the model learning rate can be ensured to be gradually decreased in each iteration, and correlation between corresponding model learning rates in two adjacent iterative training processes can also be ensured, which improves accuracy of the adjustment of the model parameters in each iterative training process, thereby improving optimization efficiency and accuracy of the speech recognition model.

As another example, the target proportion is a ratio of the quantity of the labeled data of the language newly added in this iterative training to a quantity of the labeled data of the language in the first iterative training.

Exemplarily, if the preset learning rate is denoted as $Ir0$, the model learning rate adopted in the training process based on the target data corresponding to the language A1 is $Ir0$. Then, in the training process based on the target data corresponding to the language A2, the adopted model learning rate $Ir1$ is $Ir0*(T2/T1)$. In the training process based on the target data corresponding to the language A3, the adopted model learning rate $Ir2$ is $Ir1*(T3/T1)$. In the training process based on the target data corresponding to the language A4, the adopted model learning rate $Ir3$ is $Ir2*(T4/T1)$.

Therefore, with use of the above technical solution, when the corresponding model learning rate in each iterative training process is determined, not only correlation between corresponding model learning rates in two adjacent iterative training processes can be ensured, but also the corresponding model learning rate in each iterative training process is matched with the quantity of the labeled data of the language newly added in this iteration, thereby improving accuracy of the model learning rate in each iterative training process, which can ensure a recognition rate of the trained target speech recognition model for a language with a greater quantity of the labeled data, and can also ensure a recognition rate for a language with a less quantity of the labeled data by means of a balanced prediction, so that efficiency and accuracy of the training of the speech recognition model are further improved, and use experience of a user is improved.

Figure 3:
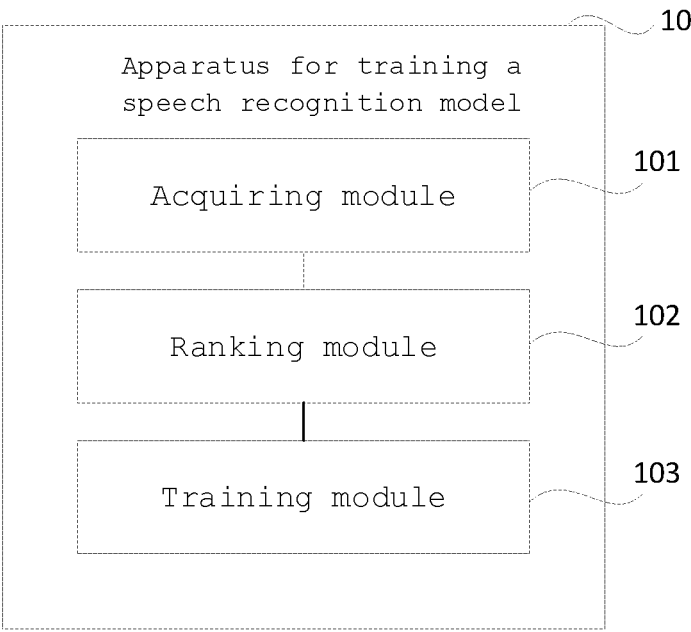
FIG. 3 is a block diagram of an apparatus for training a speech recognition model in accordance with one embodiment of the present disclosure.

The present disclosure further provides an apparatus for training a speech recognition model, as shown in FIG. 3, the apparatus 10 comprising:

an acquiring module 101 configured to acquire training data, where the training data comprises labeled data of at least two languages;

a ranking module 102 configured to rank the languages in a descending order of a quantity of labeled data of each language, to obtain a training order corresponding to the languages; and a training module 103 configured to sequentially acquire, in accordance with ranking of the languages indicated by the training order, target data corresponding to each language to perform iterative training on a preset model, to obtain a target speech recognition model, wherein the target data is determined in accordance with the labeled data of language(s) from first ranking to current ranking in the training order, and the target speech recognition model is used for performing speech recognition on speech data of the at least two languages.

Optionally, the training module comprises:

an acquiring sub-module configured to acquire target data corresponding to a target language, wherein the target language is initially a first-ranking language in the training order;

a training sub-module configured to train an initial model corresponding to the target language in accordance with the target data corresponding to the target language to obtain a target model corresponding to the target language, wherein the initial model is a preset model in a case wherein the target language is the first-ranking language, and the initial model is the target model corresponding to the language immediately before the target language in the training order in a case wherein the target language is not the first-ranking language; and take the language immediately after the target language in the training order as a new target language to trigger the acquiring sub-module to acquire the target data corresponding to the target language, until the labeled data of each language is subjected to the iterative training, and determine the target model corresponding to the last-ranking language in the training order as the target speech recognition model.

Optionally, the acquiring sub-module comprises:

a first determining sub-module configured to, in a case wherein the target language is the first-ranking language, take data of a first quantity in the labeled data of the target language as the target data, wherein the first quantity is greater than a quantity of the labeled data of the language immediately after the target language in the training order, and the first quantity is less than or equal to a quantity of the labeled data of the target language;

a second determining sub-module configured to, in a case wherein the target language is not the first-ranking language and not the last-ranking language, respectively acquire, from the labeled data of the target language and the labeled data of each language ranked before the target language, data of a second quantity as the target data, wherein the second quantity is greater than a quantity of the labeled data of the language immediately after the target language, and the second quantity is less than or equal to a quantity of the labeled data of the target language; and a third determining sub-module configured to, in a case wherein the target language is the last-ranking language, respectively acquire, from each of the languages, the labeled data of a third quantity as the target data, wherein the third quantity is a quantity of the labeled data of the target language.

Optionally, in the process of acquiring target data corresponding to each language to perform iterative training on a preset model, a model learning rate corresponding to each iterative training is in a positive correlation with a quantity of the labeled data of the language newly added in this iterative training.

Optionally, the model learning rate corresponding to each iterative training is determined by:

in a case wherein the iterative training is a first iteration, determining a preset learning rate as the model learning rate corresponding to the iterative training; and in a case wherein the iterative training is not the first iteration, determining a product of the model learning rate corresponding to previous one iterative training and a target proportion as the model learning rate corresponding to this iterative training, wherein the target proportion is less than 1.

Optionally, the target proportion is a ratio of the quantity of the labeled data of the language newly added in this iterative training to the quantity of the labeled data of the language in the first iterative training.

Figure 4:
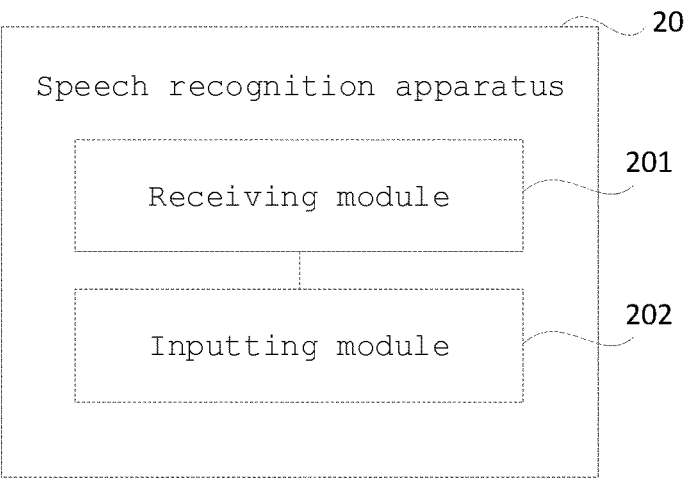
FIG. 4 is a block diagram of a speech recognition apparatus in accordance with one embodiment of the present disclosure.

The present disclosure further provides a speech recognition apparatus, as shown in FIG. 4, the apparatus 20 comprising:

a receiving module 201 configured to receive speech data to be recognized; and an inputting module 202 configured to input the speech data into a target speech recognition model, and take a recognition result output by the target speech recognition model as a recognition result of the speech data, wherein the target speech recognition model is trained in accordance with the above method for training a speech recognition model.

Optionally, the target speech recognition model comprises the target models corresponding to a plurality of languages; and the input module comprises:

a fourth determining sub-module configured to determine a language of the speech data; and an inputting sub-module configured to input the speech data into the target model corresponding to the language and take a recognition result output by the target model as a recognition result of the speech data.

Figure 5:
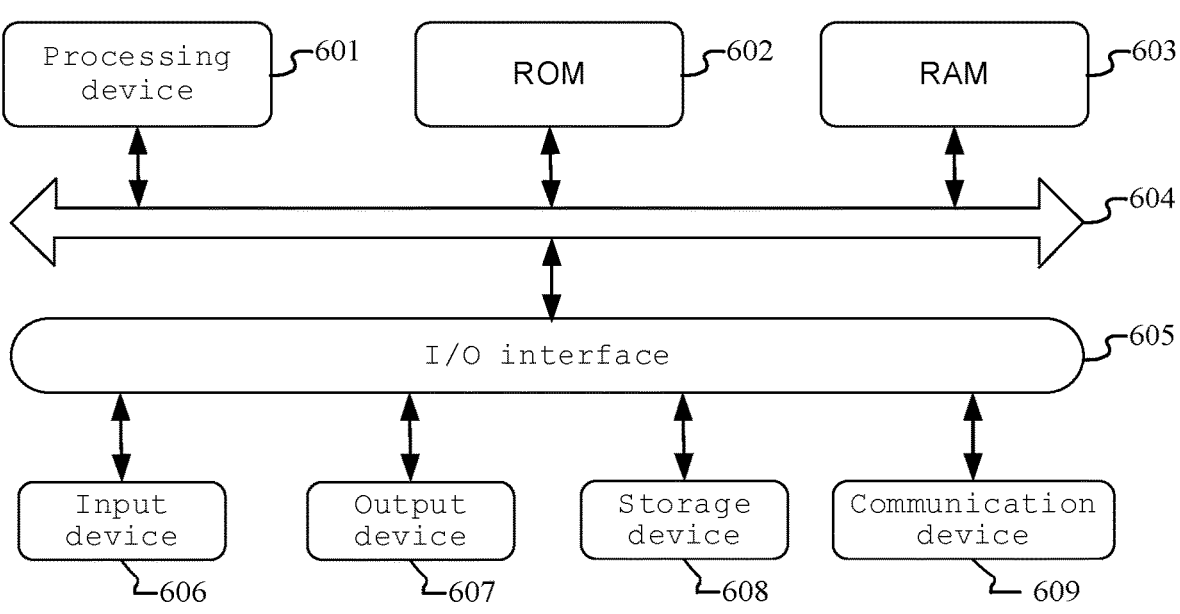
FIG. 5 illustrates a schematic structural diagram of an electronic device suitable for implementing an embodiment of the present disclosure.

Referring below to FIG. 5, a schematic structural diagram of an electronic device 600 suitable for implementing an embodiment of the present disclosure is shown. The electronic device in the embodiment of the present disclosure may include, but is not limited to, a mobile terminal such as a mobile phone, a notebook computer, a digital broadcast receiver, a PDA (personal digital assistant), a PAD (tablet computer), a PMP (portable multimedia player), and a vehicle-mounted terminal (e.g., a vehicle-mounted navigation terminal), and a fixed terminal such as a digital TV, and a desktop computer. The electronic device shown in FIG. 5 is only one example, which should not bring any limitation to the functions and use scope of the embodiment of the present disclosure.

As shown in FIG. 5, the electronic device 600 may comprise a processing device (e.g., a central processor, a graphics processor, etc.) 601, which may perform various appropriate actions and processes in accordance with a program stored in a read-only memory (ROM) 602 or a program loaded from a storage device 608 into a random access memory (RAM) 603. In the RAM 603, various programs and data needed for the operation of the electronic device 600 are also stored. The processing device 601, the ROM 602, and the RAM 603 are connected to each other via a bus 604. An input/output (I/O) interface 605 is also connected to the bus 604.

Generally, the following device may be connected to the I/O interface 605: an input device 606 including, for example, a touch screen, touch pad, keyboard, mouse, camera, microphone, accelerometer, gyroscope, etc.; an output device 607 including, for example, a liquid crystal display (LCD), a speaker, a vibrator, etc.; the storage device 608 including, for example, a magnetic tape, hard disk, etc.; and a communication device 609. The communication device 609 may allow the electronic device 600 to communicate with other devices in a wireless or wired manner to exchange data. While FIG. 5 illustrates the electronic device 600 having the various device, it should be understood that not all illustrated device are required to be implemented or provided. More or fewer devices may be alternatively implemented or provided.

In particular, in accordance with an embodiment of the present disclosure, the processes described above with reference to the flow diagrams may be implemented as a computer software program. For example, the embodiment of the present disclosure comprises a computer program product, the computer program product comprising a computer program carried on a non-transitory computer-readable medium, the computer program containing program code for performing the method illustrated by the flow diagrams. In such an embodiment, the computer program may be downloaded and installed from a network via the communications device 609, or installed from the storage device 608, or installed from the ROM 602. The computer program, when executed by the processing device 601, performs the above functions defined in the method of the embodiment of the present disclosure.

It should be noted that the computer-readable medium of the present disclosure may be a computer-readable signal medium or a computer-readable storage medium or any combination of the above two. The computer-readable storage medium may be, for example, but not limited to, an electrical, magnetic, optical, electromagnetic, infrared, or semiconductor system, apparatus, or device, or any combination of the foregoing. More specific examples of the computer-readable storage medium may comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium that contains, or stores a program for use by or in conjunction with an instruction execution system, apparatus, or device.

In the present disclosure, the computer-readable signal medium may comprise a data signal propagated in baseband or as part of a carrier wave, in which computer-readable program code is carried. Such a propagated data signal may take a variety of forms, including, but not limited to, an electromagnetic signal, optical signal, or any suitable combination of the forgoing. The computer-readable signal medium may be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: an electrical wire, optical cable, RF (radio frequency), etc., or any suitable combination of the foregoing.

In some embodiments, a client and a server may communicate using any currently known or future developed network protocol, such as HTTP (HyperText Transfer Protocol), and may be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be embodied in the above electronic device; or may exist separately without being assembled into the electronic device.

The above computer-readable medium has one or more programs carried thereon, wherein the above one or more programs, when executed by the electronic device, cause the electronic device to: acquire training data, wherein the training data comprises labeled data of at least two languages; rank the languages in a descending order of a quantity of the labeled data of each language to obtain a training order corresponding to the languages; and sequentially acquire, in accordance with ranking of the languages indicated by the training order, target data corresponding to each language to perform iterative training on a preset model, to obtain a target speech recognition model, wherein the target data is determined in accordance with the labeled data of language(s) from first ranking to current ranking in the training order, and the target speech recognition model is used for performing speech recognition on speech data of the at least two languages.

Alternatively, the above computer-readable medium has one or more programs carried thereon, wherein the above one or more programs, when executed by the electronic device, cause the electronic device to: receive speech data to be recognized; and input the speech data into a target speech recognition model, and take a recognition result output by the target speech recognition model as a recognition result of the speech data, wherein the target speech recognition model is trained in accordance with any of the above methods for training a speech recognition model.

The computer program code for performing the operations of the present disclosure may be written in one or more programming languages, which include but are not limited to an object-oriented programming language such as Java, Smalltalk, C++, and include a conventional procedural programming language, such as the "C" language or similar programming languages. The program code may be executed entirely on a user's computer, partly on the user's computer, as a stand-alone software package, partly on the user's computer and partly on a remote computer, or entirely on the remote computer or server. In a scenario in which a remote computer is involved, the remote computer may be connected to the user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product in accordance with various embodiments of the present disclosure. In this regard, each block in the flow diagrams or block diagrams may represent a module, program segment, or portion of code, which comprises one or more executable instructions for implementing a specified logical function. It should also be noted that, in some alternative implementations, functions noted in blocks may occur in an order different from that noted in the drawings. For example, two blocks shown in succession may, in fact, be executed substantially concurrently, or the blocks may sometimes be executed in a reverse order, which depends upon the functions involved. It will also be noted that each block of the block diagrams and/or flow diagrams, and a combination of the blocks in the block diagrams and/or flow diagrams, can be implemented by a special-purpose hardware-based system that performs specified functions or operations, or a combination of special-purpose hardware and computer instructions.

The involved module described in the embodiments of the present disclosure may be implemented by software or hardware. The name of the module does not, in some cases, constitute a limitation on the module itself, for example, the acquiring module can be also described as "a module configured to acquire training data".

The functions described above herein may be executed, at least partially, by one or more hardware logic components. For example, without limitation, exemplary types of the hardware logic component that may be used include: a field programmable gate array (FPGA), application specific integrated circuit (ASIC), application specific standard product (ASSP), system on chip (SOC), complex programmable logic device (CPLD), and the like.

In the context of this disclosure, a machine-readable medium may be a tangible medium, which can contain, or store a program for use by or in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

In accordance with one or more embodiments of the present disclosure, example 1 provides a method for training a speech recognition model, wherein the method comprises:

acquiring training data, wherein the training data comprises labeled data of at least two languages;

ranking the languages in a descending order of a quantity of the labeled data of each language to obtain a training order corresponding to the languages; and sequentially acquiring, in accordance with ranking of the languages indicated by the training order, target data corresponding to each language to perform iterative training on a preset model, to obtain a target speech recognition model, wherein the target data is determined in accordance with the labeled data of language(s) from first ranking to current ranking in the training order, and the target speech recognition model is used for performing speech recognition on speech data of the at least two languages.

In accordance with one or more embodiments of the present disclosure, example 2 provides the method of example 1, wherein the sequentially acquiring, in accordance with ranking of the languages indicated by the training order, target data corresponding to each language to perform iterative training on a preset model, to obtain a target speech recognition model comprises:

acquiring target data corresponding to a target language, wherein the target language is initially a first-ranking language in the training order;

training an initial model corresponding to the target language in accordance with the target data corresponding to the target language to obtain a target model corresponding to the target language, wherein the initial model is the preset model in a case wherein the target language is the first-ranking language, and the initial model is a target model corresponding to the language immediately before the target language in the training order in a case wherein the target language is not the first-ranking language; and taking the language immediately after the target language in the training order as a new target language to return to the step of acquiring target data corresponding to a target language, until the labeled data of each language has been subjected to the iterative training, and determining a target model corresponding to a last-ranking language in the training order as the target speech recognition model.

In accordance with one or more embodiments of the present disclosure, example 3 provides the method of example 2, wherein the acquiring target data corresponding to a target language comprises:

in a case wherein the target language is the first-ranking language, taking data of a first quantity in the labeled data of the target language as the target data, wherein the first quantity is greater than a quantity of the labeled data of the language immediately after the target language in the training order, and the first quantity is less than or equal to a quantity of the labeled data of the target language;

in a case wherein the target language is not the first-ranking language and is not the last-ranking language, respectively acquiring, from the labeled data of the target language and the labeled data of each language ranked before the target language, data of a second quantity as the target data, wherein the second quantity is greater than a quantity of the labeled data of the language immediately after the target language, and the second quantity is less than or equal to a quantity of the labeled data of the target language; and in a case wherein the target language is the last-ranking language, respectively acquiring, from each language of the at least two languages, the labeled data of a third quantity as the target data, wherein the third quantity is a quantity of the labeled data of the target language.

In accordance with one or more embodiments of the present disclosure, example 4 provides the method in accordance with any of examples 1 to 3, wherein in a process of acquiring the target data corresponding to each language to perform the iterative training on the preset model, a model learning rate corresponding to each iterative training is in a positive correlation with a quantity of the labeled data of the language newly added in this iterative training.

In accordance with one or more embodiments of the present disclosure, example 5 provides the method of example 4, wherein the model learning rate of each iterative training is determined by:

in a case wherein the iterative training is a first iteration, determining a preset learning rate as the model learning rate corresponding to this iterative training; and in a case wherein the iterative training is not the first iteration, determining a product of the model learning rate corresponding to previous one iterative training and a target proportion as the model learning rate corresponding to this iterative training, wherein the target proportion is less than 1.

In accordance with one or more embodiments of the present disclosure, example 6 provides the method of example 5, wherein the target proportion is a ratio of the quantity of the labeled data of the language newly added in this iterative training to a quantity of the labeled data of the language in the first iterative training.

In accordance with one or more embodiments of the present disclosure, example 7 provides a speech recognition method, wherein the method comprises:

receiving speech data to be recognized; and inputting the speech data into a target speech recognition model, and taking a recognition result output by the target speech recognition model as a recognition result of the speech data, wherein the target speech recognition model is trained in accordance with the method of any of examples 1 to 6.

In accordance with one or more embodiments of the present disclosure, example 8 provides an apparatus for training a speech recognition model, wherein the apparatus comprises:

an acquiring module configured to acquire training data, wherein the training data comprises labeled data of at least two languages;

a ranking module configured to rank the languages in a descending order of a quantity of the labeled data of each language to obtain a training order corresponding to the languages; and a training module configured to sequentially acquire, in accordance with ranking of the languages indicated by the training order, target data corresponding to each language to perform iterative training on a preset model, to obtain a target speech recognition model, wherein the target data is determined in accordance with the labeled data of language(s) from first ranking to current ranking in the training order, and the target speech recognition model is used for performing speech recognition on speech data of the at least two languages.

In accordance with one or more embodiments of the present disclosure, example 9 provides a speech recognition apparatus, wherein the apparatus comprises:

a receiving module configured to receive speech data to be recognized; and an inputting module configured to input the speech data into a target speech recognition model, and take a recognition result output by the target speech recognition model as a recognition result of the speech data, wherein the target speech recognition model is trained in accordance with the method of any of examples 1 to 6.

In accordance with one or more embodiments of the present disclosure, example 10 provides a non-transitory computer-readable medium having a computer program stored thereon, wherein the program, when executed by a processing device, implements the method of any of examples 1 to 6 or implements the method of example 7.

In accordance with one or more embodiments of the present disclosure, example 11 provides an electronic device, comprising:

a storage device having a computer program stored thereon; and a processing device configured to execute the computer program in the storage device to implement the method of any of examples 1 to 6 or to implement the method of example 7.

In accordance with one or more embodiments of the present disclosure, example 12 provides a computer program, wherein the program, when executed by a processing device, implements the method of any of examples 1 to 6 or implements the method of example 7.

In accordance with one or more embodiments of the present disclosure, example 13 provides a computer program product having a computer program stored thereon, wherein the program, when executed by a processing device, implements the method of any of examples 1 to 6, or implements the method of example 7. The foregoing description is only some embodiments of the present disclosure and explanation of the technical principles used. It should be appreciated by those skilled in the art that the disclosed scope involved in the present disclosure is not limited to the technical solution formed by a specific combination of the above technical features, but also should encompass another technical solution formed by an arbitrary combination of the above technical features or their equivalent features without departing from the above disclosed concept. For example, a technical solution formed by performing mutual replacement between the above features and technical features having functions similar to those disclosed (but not limited thereto) in the present disclosure.

Furthermore, while operations are depicted in a specific order, this should not be understood as requiring that these operations be performed in the specific order shown or in a sequential order. Under certain circumstances, multitasking and parallel processing may be advantageous. Likewise, while several specific implementation details are included in the above discussion, these should not be construed as limitations on the scope of the present disclosure. Certain features that are described in the context of separate embodiments can also be implemented in combination in a single embodiment. Conversely, various features that are described in the context of a single embodiment can also be implemented separately or in any suitable sub-combination in multiple embodiments.

Although the subject matter has been described in language specific to structural features and/or method logical actions, it should be understood that the subject matter defined in the attached claims is not necessarily limited to the specific features or actions described above. Conversely, the specific features and actions described above are only exemplary forms for implementing the claims. With regard to the apparatus in the above embodiments, the specific manner in which each module performs the operation has been described in detail in the embodiment related to the method, and will not be described in detail here.

The invention claimed is:

1. A method for training a speech recognition model, comprising:

acquiring training data, wherein the training data comprises labeled data of at least two languages;

ranking the at least two languages in a descending order of a quantity of labeled data of each language to obtain a training order corresponding to the at least two languages; and sequentially acquiring, in accordance with ranking of the at least two languages indicated by the training order, training data corresponding to each language to perform iterative training on a preset model, to obtain the speech recognition model, wherein the training data corresponding to each language is determined in accordance with labeled data of one or more languages from first ranking to current ranking in the training order, and the speech recognition model is used for performing speech recognition on speech data of the at least two languages, wherein, for a first language which is ranked first, first training data corresponding to the first language is used to train the preset model to obtain a model corresponding to the first language; for a second language which is neither ranked first nor ranked last, second training data corresponding to the second language is used to train a model corresponding to a language immediately before the second language in the training order to obtain a model corresponding to the second language; and, for a third language which is ranked last, third training data corresponding to the third language is used to train a model corresponding to a language immediately before the third language in the training order to obtain a model corresponding to the third language, and the model corresponding to the third language is determined as the speech recognition model, and wherein data of a first quantity in labeled data of the first language is taken as the first training data, wherein the first quantity is greater than a quantity of labeled data of a language immediately after the first language in the training order, and the first quantity is less than or equal to a quantity of the labeled data of the first language; and data of a second quantity acquired from labeled data of the second language and data of the second quantity acquired from labeled data of each of one or more languages ranked before the second language are used as the second training data, wherein the second quantity is greater than a quantity of labeled data of a language immediately after the second language, and the second quantity is less than or equal to a quantity of the labeled data of the second language.

2. The method according to claim 1, wherein data of a third quantity acquired from labeled data of the third language and data of the third quantity acquired from labeled data of each of one or more languages ranked before the third language are used as the third training data, wherein the third quantity is less than or equal to a quantity of the labeled data of the third language.

3. The method according to claim 1, wherein in a process of acquiring the training data corresponding to each language to perform the iterative training on the preset model, a model learning rate corresponding to each iterative training is in a positive correlation with a quantity of labeled data of a language newly added in this iterative training.

4. The method according to claim 3, wherein the model learning rate corresponding to each iterative training is determined by:

in response to an iterative training being a first iteration, determining a preset learning rate as the model learning rate corresponding to this iterative training; and in response to an iterative training being not the first iteration, determining a product of the model learning rate corresponding to previous one iterative training and a preset proportion as the model learning rate corresponding to this iterative training, wherein the preset proportion is less than 1.

5. The method according to claim 4, wherein the target preset proportion is a ratio of a quantity of labeled data of a language newly added in this iterative training to the quantity of the labeled data of the first language in the first iterative training.

6. A speech recognition method, comprising:

receiving speech data to be recognized; and inputting the speech data into a speech recognition model, and taking a recognition result output by the speech recognition model as a recognition result of the speech data, wherein the speech recognition model has been trained in accordance with the method of claim 1.

7. A non-transitory computer-readable medium having a computer program stored thereon, wherein the program, when executed by a processing device, implements following operations for training a speech recognition model:

acquiring training data, wherein the training data comprises labeled data of at least two languages;

ranking the at least two languages in a descending order of a quantity of labeled data of each language to obtain a training order corresponding to the at least two languages; and sequentially acquiring, in accordance with ranking of the at least two languages indicated by the training order, training data corresponding to each language to perform iterative training on a preset model, to obtain the speech recognition model, wherein the training data corresponding to each language is determined in accordance with labeled data of one or more languages from first ranking to current ranking in the training order, and the speech recognition model is used for performing speech recognition on speech data of the at least two languages, wherein, for a first language which is ranked first, first training data corresponding to the first language is used to train the preset model to obtain a model corresponding to the first language; for a second language which is neither ranked first nor ranked last, second training data corresponding to the second language is used to train a model corresponding to a language immediately before the second language in the training order to obtain a model corresponding to the second language; and, for a third language which is ranked last, third training data corresponding to the third language is used to train a model corresponding to a language immediately before the third language in the training order to obtain a model corresponding to the third language, and the model corresponding to the third language is determined as the speech recognition model, and wherein data of a first quantity in labeled data of the first language is taken as the first training data, wherein the first quantity is greater than a quantity of labeled data of a language immediately after the first language in the training order, and the first quantity is less than or equal to a quantity of the labeled data of the first language; and data of a second quantity acquired from labeled data of the second language and data of the second quantity acquired from labeled data of each of one or more languages ranked before the second language are used as the second training data, wherein the second quantity is greater than a quantity of labeled data of a language immediately after the second language, and the second quantity is less than or equal to a quantity of the labeled data of the second language.

8. An electronic device, comprising:

at least one memory having a computer program stored thereon; and at least one processor configured to execute the computer program in the at least one memory to implement following operations for training a speech recognition model:

acquiring training data, wherein the training data comprises labeled data of at least two languages;

ranking the at least two languages in a descending order of a quantity of labeled data of each language to obtain a training order corresponding to the at least two languages; and sequentially acquiring, in accordance with ranking of the at least two languages indicated by the training order, training data corresponding to each language to perform iterative training on a preset model, to obtain the speech recognition model, wherein the training data corresponding to each language is determined in accordance with the labeled data of one or more languages from first ranking to current ranking in the training order, and the speech recognition model is used for performing speech recognition on speech data of the at least two languages, wherein, for a first language which is ranked first, first training data corresponding to the first language is used to train the preset model to obtain a model corresponding to the first language; for a second language which is neither ranked first nor ranked last, second training data corresponding to the second language is used to train a model corresponding to a language immediately before the second language in the training order to obtain a model corresponding to the second language; and, for a third language which is ranked last, third training data corresponding to the third language is used to train a model corresponding to a language immediately before the third language in the training order to obtain a model corresponding to the third language, and the model corresponding to the third language is determined as the speech recognition model, and wherein data of a first quantity in labeled data of the first language is taken as the first training data, wherein the first quantity is greater than a quantity of labeled data of a language immediately after the first language in the training order, and the first quantity is less than or equal to a quantity of the labeled data of the first language; and data of a second quantity acquired from labeled data of the second language and data of the second quantity acquired from labeled data of each of one or more languages ranked before the second language are used as the second training data, wherein the second quantity is greater than a quantity of labeled data of a language immediately after the second language, and the second quantity is less than or equal to a quantity of the labeled data of the second language.

9. The non-transitory computer-readable medium according to claim 7, wherein data of a third quantity acquired from labeled data of the third language and data of the third quantity acquired from labeled data of each of one or more languages ranked before the third language are used as the third training data, wherein the third quantity is less than or equal to a quantity of the labeled data of the third language.

10. The non-transitory computer-readable medium according to claim 7, wherein in a process of acquiring the training data corresponding to each language to perform the iterative training on the preset model, a model learning rate corresponding to each iterative training is in a positive correlation with a quantity of labeled data of a language newly added in this iterative training.

11. The non-transitory computer-readable medium according to claim 10, wherein the model learning rate corresponding to each iterative training is determined by:

in response to an iterative training being a first iteration, determining a preset learning rate as the model learning rate corresponding to this iterative training; and in response to an iterative training being not the first iteration, determining a product of the model learning rate corresponding to previous one iterative training and a preset proportion as the model learning rate corresponding to this iterative training, wherein the preset proportion is less than 1.

12. The electronic device according to claim 8, wherein data of a third quantity acquired from labeled data of the third language and data of the third quantity acquired from labeled data of each of one or more languages ranked before the third language are used as the third training data, wherein the third quantity is less than or equal to a quantity of the labeled data of the third language.

13. The electronic device according to claim 8, wherein in a process of acquiring the training data corresponding to each language to perform the iterative training on the preset model, a model learning rate corresponding to each iterative training is in a positive correlation with a quantity of labeled data of a language newly added in this iterative training.

14. The electronic device according to claim 13, wherein the model learning rate corresponding to each iterative training is determined by:

in response to iterative training being a first iteration, determining a preset learning rate as the model learning rate corresponding to this iterative training; and in response to iterative training being not the first iteration, determining a product of the model learning rate corresponding to previous one iterative training and a preset proportion as the model learning rate corresponding to this iterative training, wherein the preset proportion is less than 1.

15. The electronic device according to claim 14, wherein the preset proportion is a ratio of a quantity of labeled data of a language newly added in this iterative training to the quantity of the labeled data of the first language in the first iterative training.

16. A non-transitory computer-readable medium having a computer program stored thereon, wherein the program, when executed by a processing device, implements following operations for speech recognition:

receiving speech data to be recognized; and inputting the speech data into a speech recognition model, and taking a recognition result output by the speech recognition model as a recognition result of the speech data, wherein the speech recognition model has been trained in accordance with the method of claim 1.

17. An electronic device, comprising:

at least one memory having a computer program stored thereon; and at least one processor configured to execute the computer program in the at least one memory to implement following operations for speech recognition:

receiving speech data to be recognized; and inputting the speech data into a speech recognition model, and taking a recognition result output by the speech recognition model as a recognition result of the speech data, wherein the speech recognition model has been trained in accordance with the method of claim 1.

\* \* \* \* \*